United States Patent
Liu et al.

(10) Patent No.: US 8,380,262 B2
(45) Date of Patent: Feb. 19, 2013

(54) SLIDE PHONE

(75) Inventors: Pei Liu, Shenzhen (CN); Xin-Long Fang, Shenzhen (CN); Wen-Jia Ren, Shenzhen (CN); Jin-Shui Chen, Shenzhen (CN); Zhong-You Li, Shenzhen (CN); Zhan-Xing Ma, Shenzhen (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 308 days.

(21) Appl. No.: 12/690,233

(22) Filed: Jan. 20, 2010

(65) Prior Publication Data
US 2011/0092259 A1    Apr. 21, 2011

(30) Foreign Application Priority Data
Oct. 20, 2009   (CN) ...................... 2009 2 0312829 U

(51) Int. Cl.
*H04M 1/00*   (2006.01)
*H04M 9/00*   (2006.01)

(52) U.S. Cl. ................................ 455/575.4; 379/433.12
(58) Field of Classification Search ............... 455/575.4
See application file for complete search history.

(56) References Cited

U.S. PATENT DOCUMENTS

| 7,158,634 B2 * | 1/2007 | Eromaki | 379/433.13 |
| 7,437,186 B2 * | 10/2008 | Park | 455/575.4 |
| 2010/0000845 A1 * | 1/2010 | Zou et al. | 200/293 |

* cited by examiner

*Primary Examiner* — Huy C Ho
(74) *Attorney, Agent, or Firm* — Altis Law Group, Inc.

(57) ABSTRACT

A slide phone includes a first body, a main sheet, a second body, a pair of lever, a keypad, and a pair of supports. The main sheet is mounted on the first body. The second body is slidably installed on the main sheet and capable of moving relative to the first body. When the slide phone is closed, the second body forms a receiving space together with the first body. The levers are positioned to opposite sides of the first body. The keypad is mounted on the levers and can be accommodated in the receiving space when the slide phone is closed, and can be lifted by the levers to be substantially coplanar with an upper surface of the second body when the slide phone is opened. The pair of supports is mounted on the first body adjacent to the lever correspondingly.

20 Claims, 4 Drawing Sheets

SLIDE PHONE

BACKGROUND

Technical Field

The disclosure relates to slide phones, and more particularly to a slide phone in which a second body slides on a first body in a longitudinal direction to expose or cover a keypad of the first body of the slide phone.

A slide phone typically includes a first body with a keypad attached thereon, and a second body with a display panel formed thereon. The second body is slidably mounted on the first body for exposing or covering the keypad. However, the second body and the first body may partially or fully overlap, such that an elevation difference exists between the display panel of the second body and the keypad of the first body. The elevation difference between the display panel and the keypad may distort the look and feel of the slide phone.

Therefore, what is needed is to provide a slide phone which can eliminate the step between the keypad and display panel in using thereby facilitating users' operations.

DETAILED DESCRIPTION

Figure 1:
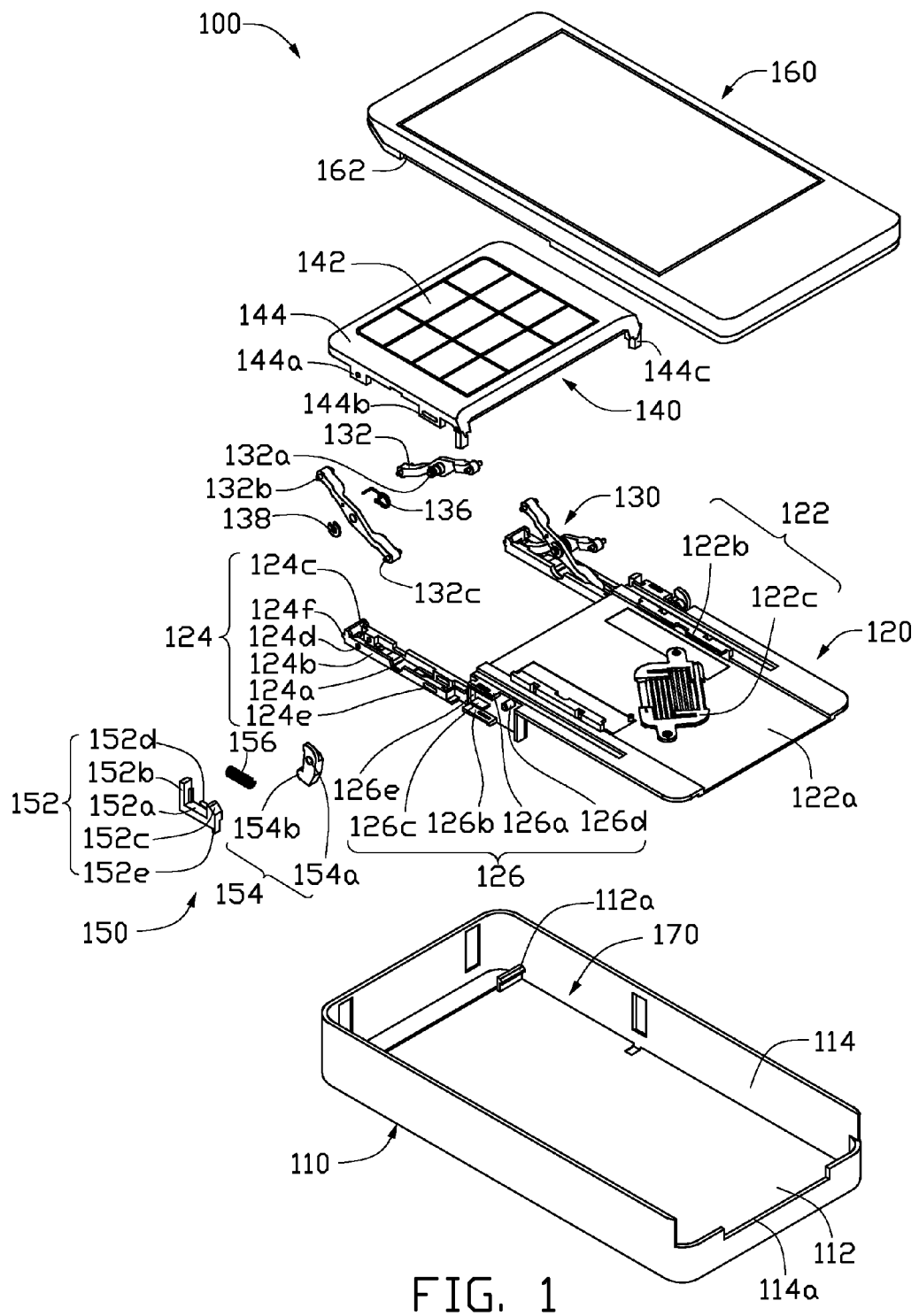
FIG. 1 is an exploded isometric view of a slide phone according to an exemplary embodiment.
Figure 2:
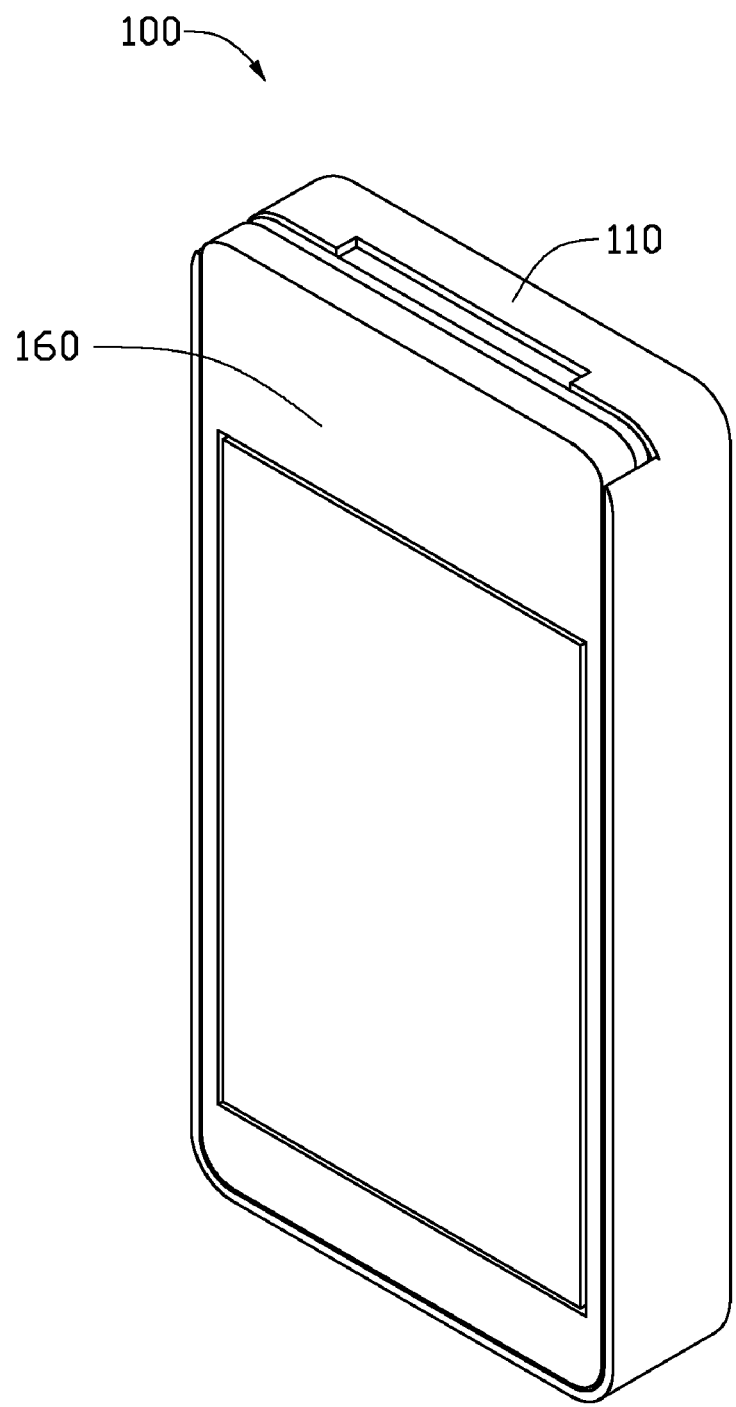
FIG. 2 is an assembled isometric view of the slide phone of FIG. 1.

Referring to FIGS. 1 and 2, a slide phone 100 according to an exemplary embodiment is shown. The slide phone 100 includes a first body 110, a main sheet 120, a pair of levers 130, a keypad 140, a pair of support devices 150, and a second body 160. The main sheet 120 is mounted on the first body 110. The pair of levers 130 are positioned on opposite sides of the first body 110 correspondingly. The keypad 140 is mounted on the levers 130 and can be moved up by the levers 130. The pair of support devices 150 are mounted on the first body 110 adjacent to the levers 130 correspondingly. The support devices 150 are further configured for sliding under the keypad 140 when the keypad 140 is raised by the levers 130, to support the keypad 140 in position. The second body 160 is slidably installed on the main sheet 120 thereby forming a receiving space together with the first body 110 for accommodating the keypad 140 when the slide phone 100 is in a closed state. The lever 130 is configured for automatically raising the keypad 140 out of the receiving space to become substantially coplanar with the second body 160 when the slide phone 100 is in an opened state.

The first body 110 includes a base sheet 112 and a peripheral side wall 114 perpendicularly extending from the surrounding edges of the base sheet 112. The base sheet 112 includes a pair of hooking members 112a perpendicularly formed on an inner side of the base sheet 112 adjacent to the peripheral side wall 114. The peripheral side wall 114 defines a cutout 114a to allow the second body 160 to partially slide out of the first body 110.

The main sheet 120 includes a guiding member 122, a pair of racks 124, and a pair of connecting members 126. The connecting members 126 connect the guiding member 122 and the racks 124 at two opposite ends of each connecting member.

The guiding member 122 includes a main sheet 122a, a pair of parallel sliding bars 122b, and an elastic member 122c. The sliding bars 122b are formed on a surface of main sheet 122a, and parallel to each other for guiding the second body 160 to slide relative to the first body 110. The elastic member 122c is mounted on the main sheet 122, and positioned between the sliding bars 122b for assisting the movement of the second body 160.

Each of the racks 124 is configured for housing one of the levers 130, and includes a bottom plate 124a, a pair of side walls 124b, and an end wall 124c. The bottom plate 124a extends linearly along a direction parallel to the sliding direction of the second body 160. The side walls 124b perpendicularly extend from two longer sides of the bottom plate 124a. The end wall 124c is located at the shorter side of the bottom plate 124a and is far away from the main sheet 120. Each of the side walls 124b includes a first pivot hole 124d for rotatably receiving a pivot of the lever 130, and a first sliding slot 124e for movably receiving another pivot of the lever 130. The first pivot hole 124d and the first sliding slot 124e are spaced from each other by a predetermined distance. The end wall 124c includes a protrusion 124f protruding from an outer surface thereof. The protrusion 124f is buckled with the hooking members 112a, thereby fastening the rack 124 on the first body 110.

The connecting members 126 are connected between ends of the racks 124 and the guiding member 122, and are perpendicular to the racks 124 and the guiding member 122. Each connecting member 126 includes an upper bracket 126a, a bottom bracket 126b, a limiting member 126c, a fulcrum shaft 126d, and a side bracket 126e. The bottom bracket 126b is formed below the upper bracket 126a, and the limiting member 126c is positioned between the upper bracket 126a and the bottom bracket 126b. The upper bracket 126a, the bottom bracket 126b and the limiting member 126c are substantially parallelly aligned with each other. The fulcrum shaft 126d is formed approximately parallel to a top end of the upper bracket 126a and is spaced away from the upper bracket 126a by a predetermined distance, thereby defining a space between the fulcrum shaft 126d and the upper bracket 126a. The side bracket 126e is perpendicularly connected on corresponding ends of the upper and bottom brackets 126a, 126b. The connecting members 126 serve as braces to hold the support devices 150 correspondingly.

Each of the levers 130 includes a pair of foldable crossed leg racks 132 rotatably connected by a pivot pin 132a. A torsional spring 136 is sleeved on the pivot pin 132a. Two ends of the torsional spring 136 abut on the leg racks 132 to pull the leg racks 132 close relative to the racks 124. A retainer 138 is snapped on an end of the pivot pin 132a for preventing the pivot pin 132a from disengaging from the leg racks 132. Each leg rack 132 includes a pair of upper guiding protrusions 132b and a pair of lower guiding protrusions 132c extending from opposite ends of the leg rack 132 latch the leg rack 132 between the rack 124 and a platform 144 of the keypad 140. The foldable crossed leg racks 132 are rotatably connected to the racks 124 by inserting the lower guiding protrusions 132c of the leg racks 132 into the first pivot holes 124d and first sliding slots 124e of the racks 124 correspondingly.

The keypad 140 includes a number of buttons 142 and the platform 144 supporting the buttons 142. The platform 144 defines a second pivot hole 144a and a second sliding slot 144b on each of the sides walls thereof. The lever 130 is movably connected to the platform 144 by inserting the upper protrusions 132b correspondingly into the second pivot hole 144a and second sliding slot 144b. The keypad 140 further includes two supporting arms 144c each with a sloped end surface. The supporting arms 144c perpendicularly extend from an end of the platform 144. An end surface of the platform 144 of the keypad 140 adjacent to the second body 160 is sloped diagonally towards the base sheet 112.

Each of the support devices 150 includes a bracket 152, a lever 154, and a spring 156. The bracket 152 of the support device 150 includes a first piece 152a, a first side arm 152b and a second side arm 152c. The first and second side arms 152b, 152c are perpendicularly interconnected with the first piece 152a. The first side arm 152b includes a sloped end surface matching the sloped end of the supporting arms 144c. A positioning piece 152d perpendicularly extends from the second side arm 152c towards the first side arm 152b. A tab 152e protrudes downwards from an under surface of the second side arm 152c. The bracket 152 is slidably mounted on the bottom bracket 126b of the connecting member 126. The tab 152e of the bracket 152 is aligned with the bottom bracket 126b to prevent the bracket 152 from disengaging from the bottom bracket 126b when the brackets 152 moves towards the racks 124. The lever 154 defines a third pivot hole 154a in one end. The lever 154 is pivotally mounted the fulcrum shaft 126d of the main sheet 120 at the third pivot hole 154a and rotatable around the fulcrum shaft 126d when the second body 160 slides. A bump 154b protrudes from another end of the lever 154 and pushes the bracket 152 when the lever 154 rotates around the fulcrum shaft 126d in a first direction. The spring 156 is coiled around the positioning piece 152d and pushes the bracket 152 away from the side bracket 126e of the connecting member 126.

The second body 160 is slidably mounted on the sliding bar 122a of the guiding member 122 and is connected to the elastic member 122b. The second body 160 includes a sloped surface for matching the sloped end surface of the platform 144. The second body 160 also includes a display panel (not labeled), and a pair of grooves 162 is defined in opposite sides of the second body 160. Each groove 162 receives an end of the lever 154 of one of the support devices 150. During the opening of the second body 160 when sliding open the slide phone 100, the second body 160 slides relative to the first body 110, and the ends of the grooves 162 catch the levers 154 to rotate the levers 154 around the third pivot shaft 126d. The bumps 154b of the levers 154 push the brackets 152 to move toward the keypad 140. The brackets 152 finally firmly support the keypad 140 after the keypad 140 has been automatically lifted by the levers 130.

Figure 3:
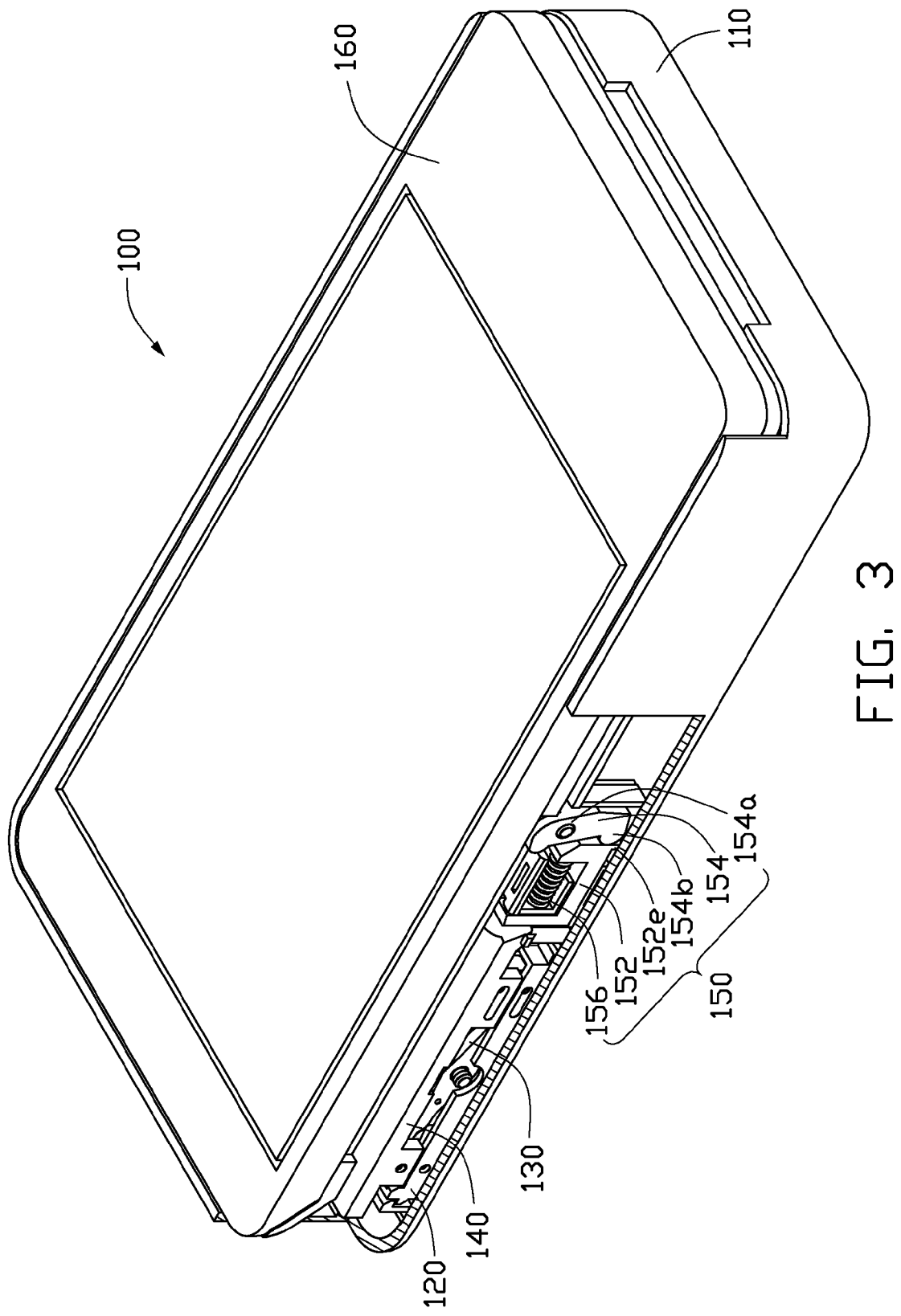
FIG. 3 is a partially isometric view of the assembled slide phone of FIG. 1.
Figure 4:
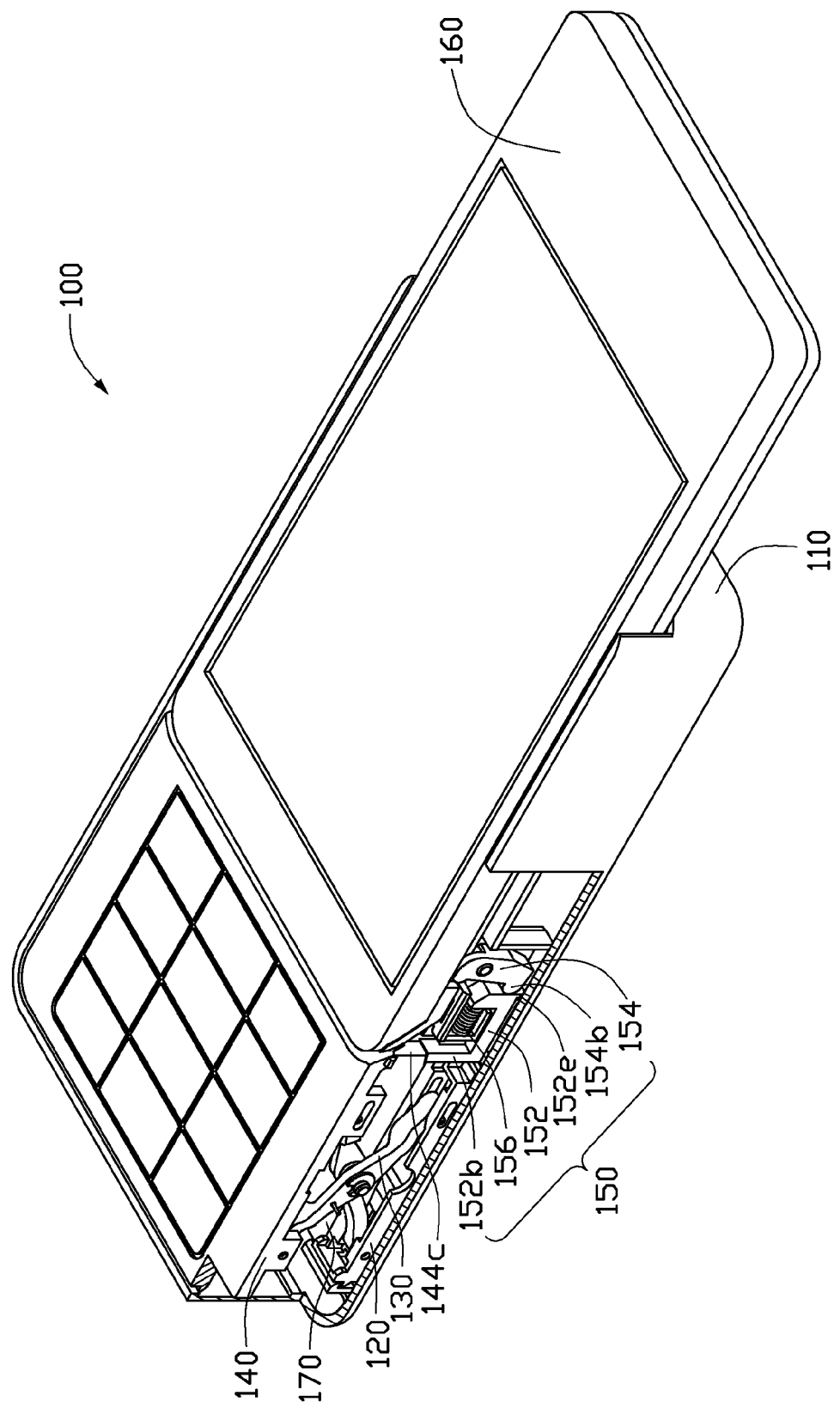
FIG. 4 is an isometric view of the slide phone of FIG. 3 with the second body being fully opened from the first body.

Referring to FIGS. 3 and 4, to slide open the slide phone 100, the second body 160 is partially slid away from the first body 110, and the keypad 140 is thereby exposed from the first body 110. The keypad 140 is lifted up by the levers 130 as the torsional springs 136 push the leg racks 132 close to each other. The second body 160 slides and actuates the lever 154 of the support device 150 to rotate around the third shaft 156. The rotated lever 154 pushes the bracket 152 to move towards the keypad 140 until the first side arms 152b move directly under the supporting arms 144c of the keypad 140, supporting the keypad 140. As a result, the keypad 140 is substantially coplanar with the display panel of the second body 160. When closing the slide phone 100, the sloped surface of the second body 160 presses the sloped end surface of the platform 144 of the keypad 140 and pushes the keypad 140 downwards. The leg racks 132 of the lever 130 are flatted under the press force from the keypad 140, and are finally enclosed between the second body 160 and first body 110.

Meanwhile, the pressed spring 156 of the support device 150 drives the bracket 152 and lever 154 to their respective original positions.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A slide phone, comprising:
    a first body comprising a base sheet and a peripheral side wall perpendicularly extending from the surrounding edges of the base sheet;
    a main sheet mounted on the first body, the main sheet comprising a guiding member, a pair of racks positioned on opposite sides of the first body, and a pair of connecting members connecting the guiding member and the racks at two opposite ends of each connecting member;
    a second body slidably installed on the guiding member of the main sheet and capable of moving relative to the first body to open or close the slide phone, wherein when the slide phone is closed, the second body forms a receiving space together with the first body, and the peripheral side wall of the first body defines a cutout therein for allowing the second body to partially slide out of the first body to open the slide phone;
    a pair of levers positioned on opposite sides of the first body, each lever connected to a corresponding one of the racks by one pair of ends of the lever;
    a keypad mounted on another pair of ends of each of the levers, the keypad being lifted up or pulled down relative to the first body by the levers, wherein the keypad is pulled down by the levers to be accommodated in the receiving space when the slide phone is closed, and is lifted up by the levers to be substantially coplanar with an upper surface of the second body when the slide phone is opened; and
    a pair of supports slidably mounted on the first body adjacent to the levers via the connecting members correspondingly for supporting a bottom surface of the keypad when the keypad has been lifted up by the levers.

2. The slide phone of claim 1, wherein each of the racks comprises a bottom plate extending linearly along a direction parallel to the moving direction of the second body, and a pair of side walls perpendicularly extending from two longer opposite sides of the bottom plate; each side wall comprises a first pivot hole and a first sliding slot defined therein; and said one pair of ends of each of the levers are rotatably received in the first pivot hole and the first sliding slot.

3. The slide phone of claim 2, wherein each of the racks further comprises an end wall located at the shorter side of the bottom plate that is away from the main sheet.

4. The slide phone of claim 3, wherein each of the end walls comprises a protrusion protruding outwards from an outer surface thereof; and the protrusion is buckled with a hooking member that is perpendicularly formed on an inner side of the base sheet of the first body adjacent to one edge of the base sheet.

5. The slide phone of claim 1, wherein each lever comprises a pair of foldable crossed leg racks rotatably connected by a pivot pin, the pair of foldable crossed leg racks rotate relative to each other to pull the keypad close relative to the racks or push the keypad far relative to the racks.

6. A slide phone, comprising:
a first body comprising a base sheet and a peripheral side wall perpendicularly extending from the surrounding edges of the base sheet;
a main sheet mounted on the first body, the main sheet comprising a guiding member, a pair of racks positioned on opposite sides of the first body, and a pair of connecting members connecting the guiding member and the racks at two opposite ends of each connecting member;
a second body slidably installed on the guiding member of the main sheet and capable of moving relative to the first body to open or close the slide phone, wherein each of the racks comprises a bottom plate extending linearly along a direction parallel to the moving direction of the second body and a pair of side walls perpendicularly extending from two longer opposite sides of the bottom plate, and each side wall of each of the racks comprises a first pivot hole and a first sliding slot defined thereon; when the slide phone is closed, the second body forms a receiving space together with the first body; and the peripheral side wall of the first body defines a cutout therein for allowing the second body to partially slide out of the first body to open the slide phone;
a pair of levers positioned on opposite sides of the first body, and each lever connected to a corresponding one of the racks by one pair of ends of the lever being rotatably received in the first pivot holes and the first sliding slots of the sidewalls of the rack, respectively;
a keypad mounted on another pair of ends of each of the levers, the keypad being lifted up or pulled down relative to the first body by the levers, wherein the keypad is pulled down by the levers to be accommodated in the receiving space when the slide phone is closed, and is lifted up by the levers to be substantially coplanar with an upper surface of the second body when the slide phone is opened; and
a pair of supports slidably mounted on the connecting members adjacent to the levers correspondingly for supporting a bottom surface of the keypad when the keypad has been lifted up by the levers;
wherein each of the levers comprises a pair of foldable crossed leg racks rotatably connected by a pivot pin, a torsional spring sleeved on the pivot pin and abutting on the leg racks to pull the leg racks close relative to the racks, and a retainer snapped on an end of the pivot pin; each leg rack comprises an upper guiding protrusion and a pair of lower guiding protrusions extending from opposite ends of the leg rack respectively; and the of foldable crossed leg racks of each lever are rotatably connected to the corresponding rack by inserting the lower guiding protrusions of the leg racks into the corresponding first pivot holes and first sliding slots of the rack.

7. The slide phone of claim 6, wherein the keypad comprises a plurality of buttons and a platform supporting the buttons; the platform defines a second pivot hole and a second sliding slot in each of two opposite side walls thereof; and each lever is movably connected to the platform by inserting the upper guiding protrusions of the lever correspondingly into the second pivot hole and second sliding slot of a corresponding side wall of the platform.

8. The slide phone of claim 7, wherein the keypad further comprises two supporting arms perpendicularly extending from one end of the platform; and each of the supporting arms has a sloped end surface.

9. The slide phone of claim 8, wherein each of the connecting members includes an upper bracket, a bottom bracket, a limiting member, a fulcrum shaft, and a side bracket; the bottom bracket is formed below the upper bracket; the fulcrum shaft is formed approximately parallel to a top end of the upper bracket and spaced away from the upper bracket by a predetermined distance; the side bracket is perpendicularly connected to one end of the upper bracket and bottom bracket; and the supports are respectively held by those elements of the connecting members.

10. The slide phone of claim 9, wherein each support device comprises a bracket, a lever and a spring; the bracket comprises a first piece, and a first side arm and second side arm each perpendicularly connected with the first piece; the bracket of the support device is slidably mounted on the bottom bracket of the connecting member by the first piece thereof; the lever of the support device comprises a third pivot hole defined therein; the lever of the support device is pivotally mounted on the fulcrum shaft via the third pivot hole and capable of being rotated around the fulcrum shaft of the corresponding connecting member when the second body slides to push the bracket to slide underneath the keypad to support the keypad; and the spring is positioned between and resists on the bracket of the support device and the side bracket of the connecting member.

11. The slide phone of claim 10, wherein the connecting member further comprises a limiting member positioned between the upper bracket and the bottom bracket; and the spring is supported by the limiting member.

12. The slide phone of claim 11, wherein the first side arm of the bracket of each support device comprises a sloped end surface matching with the sloped end surface of one of the supporting arms; the second side arm of the bracket comprises a positioning piece perpendicularly extending therefrom towards the opposite first side arm of the bracket; and the spring of the support device is coiled on the positioning piece.

13. The slide phone of claim 11, wherein the bracket of each support device further comprises a tab that extends downwards from an under surface of the second side arm and is aligned with the bottom bracket of the connecting member to prevent the bracket from disengaging from the bottom bracket when the bracket moves towards the corresponding rack.

14. The slide phone of claim 11, wherein the lever of each support device further comprises a bump protruding from another end thereof, and the bump pushes the bracket of the support device when the lever rotates around the fulcrum shaft of the connecting member.

15. The slide phone of claim 11, wherein an end surface of the platform of the keypad adjacent to the second body is sloped diagonally towards the base sheet; and the second body comprises a sloped surface for matching with the sloped end surface of the platform.

16. The slide phone of claim 11, wherein the second body comprises a pair of grooves respectively defined on opposite sides thereof; and each groove receives an end of the lever of one of the support devices.

17. A slide phone, comprising:
a first body;
a main sheet mounted on the first body, the main sheet comprising a guiding member, a pair of racks positioned on opposite sides of the first body, and a pair of connecting members connecting the guiding member and the racks at two opposite ends of each connecting member;
a second body slidably installed on the guiding member and capable of moving relative to the first body to open or close the slide phone, wherein when the slide phone is closed, the second body forms a receiving space together with the first body;

a pair of levers, each lever connected to a corresponding one of the racks by one pair of ends of the lever;

a keypad mounted on another pair of ends of each of the levers, wherein the keypad is accommodated in the receiving space when the slide phone is closed, and is lifted up by the levers to be substantially coplanar with an upper surface of the second body when the slide phone is opened; and a pair of supports slidably mounted on the connecting members correspondingly for supporting a bottom surface of the keypad when the keypad has been lifted up by the levers.

18. The slide phone of claim 17, wherein each rack comprises a bottom plate extending linearly along a direction parallel to the moving direction of the second body, and a pair of side walls perpendicularly extending from two longer opposite sides of the bottom; each side wall comprises a first pivot hole and a first sliding slot defined therein; and said one pair of ends of the corresponding lever are rotatably received in the first pivot holes and the first sliding slots of the rack.

19. The slide phone of claim 18, wherein each of the levers comprises a pair of foldable crossed leg racks rotatably connected by a pivot pin, a torsional spring sleeved on the pivot pin and abutting on the leg racks to pull the leg racks close relative to the racks, and a retainer snapped on an end of the pivot pin; each leg rack comprises an upper guiding protrusion and a pair of lower guiding protrusions extending from opposite ends of the leg rack, respectively; and the pair of foldable crossed leg racks of each lever are rotatably connected to the corresponding rack by inserting the lower guiding protrusions of the leg racks into the corresponding first pivot holes and first sliding slots of the rack.

20. The slide phone of claim 17, wherein each lever comprises a pair of foldable crossed leg racks rotatably connected by a pivot pin, the pair of foldable crossed leg racks rotate relative to each other to pull the keypad close relative to the racks or push the keypad far relative to the racks.

* * * * *